United States Patent [19]

Billings

[11] Patent Number: 4,788,936

[45] Date of Patent: Dec. 6, 1988

[54] METHODS FOR BEDDING LIVESTOCK AND TREATING SLUDGE

[76] Inventor: Lanny D. Billings, R.R., Orchard, Nebr. 68764

[21] Appl. No.: 114,309

[22] Filed: Oct. 27, 1987

[51] Int. Cl.⁴ .............................................. A01K 45/00
[52] U.S. Cl. .......................................................... 119/1
[58] Field of Search ............................. 428/221; 119/1

[56] References Cited

U.S. PATENT DOCUMENTS

| | | | |
|---|---|---|---|
| 3,980,050 | 12/1974 | Neubauer | 119/1 |
| 4,258,659 | 4/1979 | Rowell | 119/1 |
| 4,311,115 | 9/1980 | Litzinger | 119/1 |
| 4,621,011 | 9/1985 | Fleischer et al. | 428/221 |
| 4,686,937 | 12/1984 | Rosenfeld | 119/1 |

Primary Examiner—Robert Peshock
Attorney, Agent, or Firm—Zarley, McKee, Thomte, Voorhees & Sease

[57] ABSTRACT

A method of bedding livestock includes placing an Aspen bark-based pellet product on the floor of a livestock confinement area, arranging the pellets in a layer of a generally uniform depth and housing livestock in the area on the layer of pellets. A sludge treatment method includes mixing the Aspen bark-based pellet product with sludge in a ratio of 1 part pellet to up to 40 parts sludge by weight in composting the mixed pellets and sludge to form a composted product. The Aspen bark-based pellets include between 5 and 45% Aspen bark, the balance including Aspen sawdust, ground wood chips and ground lumber.

25 Claims, 1 Drawing Sheet

METHODS FOR BEDDING LIVESTOCK AND TREATING SLUDGE

BACKGROUND OF THE INVENTION

The present invention is directed generally to methods of bedding animals and treating sludge and more particularly to such methods using Aspen or Poplar bark-based pellets formed in a manner and size for use as a super absorbent animal bedding, sludge filler, mulch or plant food.

A significant problem associated with known animal bedding materials is the noxious ammonia smell which is produced when animal urine contacts the solid waste of the animal in the presence of oxygen. A common bedding material for large animals is straw which has little absorbency and which is primarily used to separate the animal from its waste which passes through the straw. Straw bedding therefore exhibits substantial odor. Furthermore, the straw bedding must be changed every two to four days to keep the animals reasonably dry. Such maintenance is labor intensive, costly and results in substantial waste product which may not be easily disposed of.

Similar problems are associated with other animal bedding materials such as sawdust, general wood pellets, alfalfa pellets, wood chips and ground corn cobs. These materials have limited absorbency such that their use results in the same problems of odors and the need for frequent replacement, together with the associated costs and waste disposal problems.

Small eighth inch diameter pellets of Aspen wood have been manufactured on a small scale and used as a cat litter. Wide spread applications for super absorbent pellets of that nature were not appreciated.

SUMMARY OF THE INVENTION

The present invention is directed to methods for bedding livestock and treating sludge using pellets formed from hard wood from the Poplar family, preferably Aspen, which pellets include bark as a substantial element thereof. The bark content of the pellets is between 5 and 45% by volume, with the balance being a combination of sawdust, ground wood chips and ground lumber. The preferred pellet product has a moisture content of between 5 and 15% and pellets ranging in size from a width of between 1/16 inch and ¾ inch and a length of between ⅛ inch and ¾ inch. The resulting pellets will absorb 6.5 times their weight in liquid and have been found to be remarkably effective for absorbing and eliminating odors.

The method of providing bedding for a livestock confinement area, according to the present invention, includes placing the Aspen bark-based pellets on the floor of a livestock confinement area, arranging the pellets in a layer of a generally uniform depth and housing livestock in the area on the layer of pellets. This method is ideal for use in horse stables, dairy confinements, hog confinements, sow farrowing, calf confinements, poultry houses, pet stores and for any other animals or fowl that require clean bedding. The pellets of approximately 5/16 inch diameter are preferred for large animal bedding with the pellets arranged in a 3 to 5 inch deep layer. For small animals and poultry, the same size pellet may be used but in a layer of reduced thickness, preferably between 1/4 inch and 1 inch or more.

This method improves the health of any livestock by keeping the animals cleaner and dryer. The pet animals, which are bedded according to the present invention, are thus more attractive and objectionable odors normally associated with housing pets are substantially eliminated. The environment in a pet store, for example, is dramatically improved by use of the present invention, both in terms of elimination of odors and keeping the display animals fresh, clean and attractive.

It has been found that the present invention results in the removal of only about one-third as much waste as compared to conventional bedding materials. The super absorbency and noncompaction qualities of the bark-based pellet product assures efficient utilization of all bedding material. The pellets resist crumbling despite using only the natural binders present in the wood and bark raw materials. Dust pollution from stock piling of bedding material is therefore eliminated. Whereas the use of wood chip bedding has been known to dehydrate horses, hooves, the low sap content of the Poplar wood and bark in the pellets of the present invention cures this problem. Finally, the pelleted bedding material of the invention will not even harm an animal that eats it. Caribou and deer are known to feed off of the bark of Aspen trees for winter food. No chemicals are added in the pelleting process so that the resulting pellets are all natural and biodegradable. After use as bedding material, the combined pellets and animal waste are readily usable as mulch, plant food, a fertilizer substitute, a ground filler and even as a fuel.

The method of treating sludge from a human waste treatment facility, according to the present invention, likewise includes providing the Poplar bark-based pellets and mixing those pellets with sludge in a ratio of one part pellet to up to forty parts sludge by weight and composting the mixed pellets and sludge to form a composted product. Pellets having a ⅛ inch diameter and a length of between ¼ inch and ½ inch are preferred. After composting, the composted product may be dried and granulated by mixing the composted product in a heated drying tank thereby allowing the product to naturally crumble into granular form. This granular product is likewise an ideal plant food, mulch, fertilizer substitute, filler and can alternately be used as a fuel.

The sludge treatment method of the invention therefore utilizes a most economical and replenishable natural resource, that of Aspen wood timber and bark, to solve a dangerous and growing environmental problem, namely the safe and practical treatment and disposal of human waste without any negative environmental impact.

DETAILED DESCRIPTION OF THE INVENTION

Figure 1:
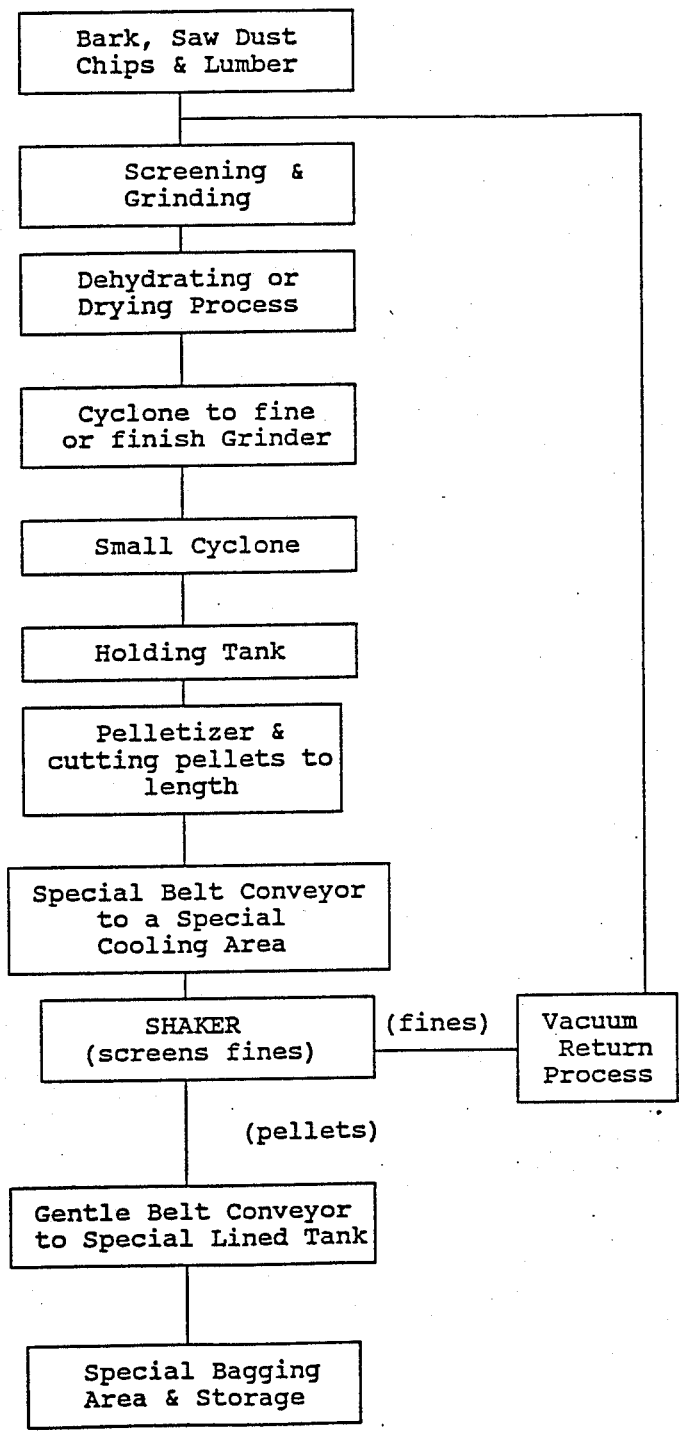
FIG. 1 is a flow chart illustrating the manufacturing process for the Poplar bark-based pellets of the invention.

The livestock bedding and sludge treatment methods of the present invention both use a unique Aspen bark-based pellet having superior characteristics relating to noncompaction and liquid and odor absorption. These pellets can be very economically manufactured from the wood waste of a sawmill. At such mills, wood waste is hogged or mechanically chipped for conversion into a marketable wood chip product. Bark is not acceptable for pulping however so mills that convert their waste to pulp chip must debark the logs before they are sawed. The bark is generally an unmarketable waste product. In sawmills which process Aspen wood for pulp, boxes, crates, excelsior and matches, for example, it has been found that the bark and offal from the Aspen timber can be most advantageously used as raw materials for the Aspen bark-based pellets of the invention.

In the sawmill, logs are generally debarked by hollow revolving barking drums through which the logs are passed. The logs rub against angle arms set inside the drum. In this way most of the bark is removed.

Unusable boards and large scraps are processed through a chipper, a revolving steel disk with several knives extending from its surface. The boards are run at an angle against the face of the revolving disk so that the knives reduce them to chips in a remarkably short time. The chips are sorted by means of screens with oversize pieces being processed back through the chipper with nothing left over but sawdust.

The chipping market is not profitable. The chips can be profitably utilized however by being added to the offal pile which includes bark and the arcuate edges of logs. This becomes the raw material for the pellet operation.

That raw material should include between 5 and 45% bark by volume and preferably 25 to 30%. The remainder is a combination of sawdust, chips and lumber. Because the sawdust element may include bark, the actual bark content of the mixture will often be greater than the quantity of the bark element alone. An example of one mixture is bark 12%, sawdust 20%, chips 34% and lumber 34%. These percentages may be varied plus or minus 50% each and preferably result in a mixture including between 20 and 30% bark.

From the offal pile, a loader pushes the mixture onto a conveyor which elevates the materials over a ½ inch to ¾ inch screen which may be of the type referred to as a radar scalper screen. The unscreened scraps are run through a hog or grinder pulverizer machine equipped with a ½ inch to ¾ inch screen. A commercially available grinder is the 45 WBHog Serial No. 12996. The screened material is mixed with the output from the hog and conveyed to the dehydrator for drying the mixture down from its natural 43 to 52% moisture content to between 5 and 15% and preferably between 6 and 8%. The dehydrator may be a California drum in which the material is continuously moved through the dryer having an internal temperature of up to 1200° F. and a capacity of 7 to 9 tons per hour, for example.

A small elevator may take about 10 to 12% of the dried product directly to a wood-burning boiler to fuel the boiler for the dehydrator. Thus there is practically no energy cost as compared to what would be required for LP gas or electricity.

A cyclone takes the remaining dried product to a finish grinder or Hog which may be a 45×54 Mill Hog No. 12997, for example which pulverizes the product through a ¼ to 5/16 inch finish screen. Another small cyclone then takes the product to a holding bin or tank from which a conveyer feeds the pellet mills. In the pelleter, steam from the boiler may be added at approximately 40 lbs. pressure to make the pellets compact and hold their shape until they are cut off the drum at desired lengths.

Three sizes of screens may be used in the pelleter. They will make a pellet ¼ inch, 5/16 inch and ⅜ inch round. A wiping arm on the pelleter drum cuts the pellets to a length of between ⅛ inch and ¾ inch and preferably between ¼ inch and ½ inch.

From the pelleter, a special belt conveyer gently moves the pellets to the cooling process with the cooled pellets being passed through a shaker for removing fines and returning those fines by a vacuum process to the input raw material. Finally, the pellets are bagged with the bags being arranged in a storage area. Because the pellets are virtually dust free, they could alternately be transported in bulk for storage at a user's site with no problems of dust pollution.

This Aspen bark-based pelleted product is ideal for providing bedding on the floor of a livestock confinement area. Tests wherein the Aspen bark-based pellets were used with dairy calves, horses, poultry, hogs and in pet stores, established that the method of the invention can produce a better, cleaner and healthier environment for all animals, pets and fowl.

A first test was conducted at a dairy farm using two stalls measuring 3½ feet by 4 feet. The first stall was bedded with approximately twenty pounds of rye straw which was baled and dry. This provided 8 to 10 inches of bedding. The second pen was bedded with 18 eight-quart bags of the Aspen bark-based pellets. This provided a 4 inch depth of bedding. One calf was placed in each pen. Four days later, each pen was checked for moisture and the condition of the bedding. In the first pen, the straw was damp and the calf's front legs were wet and discolored. Upon turning the straw, it was evident that both the bottom of the straw and the concrete were wet. The pellet bedding in the second pen showed only one spot of any dampness. This area was about one square foot. The balance of the bedding was dry. Furthermore, there was no odor in the second pen whereas the first pen did have an odor from the manure. Straw bedding in dairy pens is generally cleaned every four days during the dry season and approximately every two days during the wet season. The Aspen bark-based pellet bedding, on the other hand, has provided satisfactory bedding for up to twenty days thereby substantially reducing the frequency of replacing bedding material. Savings can therefore be realized both in terms of reduced labor and reduced cost of bedding materials, while at the same time providing a drier, cleaner environment for the livestock.

Hog farrowing houses will benefit greatly from the bedding method of the invention. If farrowing pens are not kept dry, the wet or dampened environment can be fatal for newborn pigs. Clean, dry floors help prevent bloody scours in small pigs. In older pigs, sneezing, coughing, blowing and snorting can be caused by dust in the straw or irritants from sawdust or similar products. The resulting atrophic rhinitis can be prevented with the Aspen bark-based pellets of the invention. Furthermore, when straw is used, the new born pigs often crawl into the straw. The sow, not being able to see them, may lay on a small pig crushing it. The pellet bedding would virtually eliminate this risk.

The United States is estimated to have more than nine million five-hundred thousand horses. Accordingly, the bedding materials required for these animals and the waste produced by them is substantial. Many horse barns stockpile sawdust adjacent the barn for bedding material. Much of the sawdust is scattered by the wind creating an environmental hazard and an annoyance for neighboring residents. Damp conditions are unhealthy and will wreak havoc with a horse's feet, so it is important that they be kept dry. Thrush is a degeneration of the frog of the feet caused by poor sanitation. Clean stables also reduce diseases caused by flies and mosquitoes. Wood chips have been used as horse bedding but the sap contained in most woods is hard on the horse's hooves. This problem is not applicable to Aspen, however, because Aspen is lacking in the sap and oils that are present in most other types of trees.

The method of the invention is equally applicable for poultry, both for the floors of the confinement buildings as well as in the breeding nests.

The thickness of the bedding material for poultry confinement areas may be reduced to between approximately ¼ inch and one inch. In one test in a poultry house, the Aspen-based pellet product was compared side by side with conventional peat moss. The peat moss was wet after four days and exhibited a noticeable ammonia odor after seven days. The bark-based pellets, on the other hand, remained dry after ten days and exhibited no odor. Furthermore, most poultry diseases can be prevented with good, clean, dry bedding. Aspergillosis is a disease caused by fungus. Outbreaks usually occur only under moist conditions which support the growth of mold. This is breathed in by the birds and there is no treatment. In raising baby chicks, the type of bedding can be critical. The main criteria for bedding is that it be dry and absorbent and have some insulating value. Sawdust cannot be used because the baby chicks have a tendency to eat it since they can't distinguish it from their feed.

Finally, the Aspen bark-based pellets have been tested as bedding material in pet shops for all sorts of animals including hamsters and gerbils. The cleaner appearance of the animal cages and virtually odor-free atmosphere in the pet shop resulting from such bedding significantly improved the environment for both the health and sales of the pets.

The effectiveness of the livestock bedding method of the invention is at least in part attributable to the superior odor absorbency of the Aspen bark-based pellets.

This odor absorbency was demonstrated in a comparison test with six other conventional bedding materials. 37.8 grams of ammonia were added to 37.8 grams of each bedding material. After two minutes, the materials were tested, with the results recorded in column number 1. An additional 37.8 grams of ammonia was then immediately added to each material and another smell test was made after an additional two minutes with the results recorded in column number 2. Without adding further ammonia, those materials which had not already exhibited a strong ammonia odor were tested again after an additional seven minutes and again seventeen minutes after that with the results recorded in columns 3 and 4.

| Odor Absorbency Test | | | | |
|---|---|---|---|---|
| Bedding Material (37.8 grams) | 37.8 grams ammonia added (2 min.) #1 | 37.8 grams ammonia added (2 min.) #2 | (7 min.) #3 | (17 min.) #4 |
| Pine Sawdust | Strong Odor | | | |
| Pine Pellets | Strong Odor | | | |
| Alfalfa Pellets | Weak Odor | Strong Odor | | |
| Cedar Chips | Strong Odor | | | |
| Clay Granules | Weak Odor | Strong Odor | | |
| Ground Cob | Fairly Strong | Fairly Strong | Fairly Strong | |

| -continued | | | | |
|---|---|---|---|---|
| Odor Absorbency Test | | | | |
| Bedding Material (37.8 grams) | 37.8 grams ammonia added (2 min.) #1 | 37.8 grams ammonia added (2 min.) #2 | (7 min.) #3 | (17 min.) #4 |
| Aspen Bark-Based pellets, 5/16" diameter. | No odor | No odor | Little Odor | Not at all Offensive |

References to "Poplar" throughout the specification and claims are to be construed as including all of the woods of the Poplar family, namely the Poplar, Aspen and Cottonwood. Aspen is the preferred wood of the Poplar family as it is believed to have the best qualities of liquid and odor absorption and excellent noncompaction characteristics. Nevertheless, it is to be understood that when the term "Aspen" is specified herein, Poplar or Cottonwood could be substituted for it within the scope of the present invention.

Aspen trees are common in all of Canada and are widespread throughout North America in the uplands and mountainous regions. The bark of the young Aspen tree is yellowish-green or nearly white while that of the older tree is dark brown to black. The Aspen is important in natural reforestation. It is the first growth on burnt-over land as it develops quickly, protecting the young stages of more permanent trees.

Aspen wood is commonly used for pulp, boxes, crates, excelsior and matches. It is a source of winter feeding for the caribou and deer in the northern regions. The inner bark contains an ingredient that acts as a pain reliever. Deer and caribou are known to feed on this inner bark after birthing to act as a healer. Aspen is a readily replenishable resource and therefore a very practical and economical raw material for the pelleted product used in the methods of the invention.

The present invention is further directed to the use of the Aspen bark-based pellets to aid in sludge composting, especially in human waste treatment plants, as that is an area that is a real concern at this time. The pellets will totally decompose, will aid in odor control and will absorb many times more moisture than wood chips and will provide the same porosity and structural stability in the sludge pile, while being very competitive in price.

Generally, the moisture content of a composting mixture should be much greater than the lowest level at which bacterial activity will occur, which is about 12–15%. The optimum moisture content for efficient composting is usually in the range of 50–60%.

Sewage sludge and night soil contain a great deal of moisture in their untreated state, typically over 92%. Even when dewatered, they may still be too wet to be composted on their own and amendments or bulking agents are required to reduce the moisture content and provide structural integrity as well as to increase the carbon content. Typically amendments include sawdust, straw, garbage, grass, etc. Typically bulking agents include wood chips, shredded tires, rocks, peanut shells, etc.

Composting material that consists of small particles is more readily decomposed than material with larger particles as the surface area of contact is greater. At the same time, if particles are too fine, there will be less oxygen diffusion. Furthermore, very fine material tends to loose some of its usefulness as a soil amendment.

A well produced mature compost is free from odor and easy to handle, store and transport. Mature compost contains trace and essential elements of which the most important are nitrogen, phosphorus, potassium and sulphur. The compost can therefore be used in somewhat the same way as an inorganic fertilizer. Unlike inorganic fertilizers, compost has a humus-like quality that makes it even more useful, especially in areas of the world where the humus content of the soil is being rapidly depleted as a result of excessive cultivation and land erosion. That is to say, compost can replace lost humus.

The most important use of compost is its application to land. This takes several forms. It can be applied to land as a fertilizer, soil conditioner or mulch or can be used as a means of land reclamation. Furthermore, the use of compost can range from domestic applications by the home gardener to large scale applications by commercial farmers to their crop land and by municipalities for park lands. The application of compost to land has several advantages. Its positive effects on plant growth, fruit, crop yields, and other factors compared with the effects of fertilizers alone are well documented.

The advantages it has over inorganic fertilizers lie in its effects on the soil. The soil is improved and it is more productive. Compost may not only amend the physical properties of the soil but it may have other beneficial effect such as raising the pH of acid soils. Production of compost may be of great interest especially in countries with poor arid soils.

The advantages of adding compost to sandy soil include an increase in water content and water retention, enhancement of aggregation of soil particles and reduction in erosion. The addition of compost to clay soil increases aeration and permeability of the soil to water and decreases potential crusting of the soil surface and compaction. Compost may be used on land for agricultural, horticulture, home gardening, vegetable gardening, viticulture, landscaping, landfill, forestry or commercial farming. It is usually applied as mulch, soil conditioner or fertilizer for many of these applications.

Sewage sludges, which have a moisture content of 70-95%, must be mixed with a suitable bulking material which will lower the moisture content to 55-65% before they can be properly composted. Suitable bulking materials must have a high moisture absorption capacity, provide structure and porosity to the mix, and be of a carbonaceous nature to achieve a final C:N ratio of about 30:1.

The choice of a bulking material depends on local availability, cost and performance. The Aspen bark-based pellets described herein are an excellent bulking material because they have all of the above qualities. The best quality is the absorption capacity. Wood chips are 43 to 50% moisture to begin with so their absorption is limited. The Aspen bark-based pellets of the invention will absorb approximately 4 to 6½ times more moisture than wood chips.

The sludge treatment method of the present invention includes providing the Poplar bark-based pellets as described above and mixing them with sludge in a ratio of 1 part pellet to up to 40 parts sludge by weight and then composting the mixed pellets and sludge to form a composted product.

If there is adequate pathogen reduction and controlled levels of heavy metals, there are many uses for composted material. Composted material has been used in place of top soil in the following areas: flower beds, top dressing of existing lawns, potting material, roadside vegetation and turf development in parks, cemeteries, ball fields, etc., The composted material is sold to highway departments to be used as a substitute for top soil for maintenance projects. Research in this field is comparatively recent.

Large scale public works applications require large volumes of compost. Applications include public parks, highway departments and other land reclamation projects. The Hawkins Point Hazardous Waste Landfill in Baltimore, Maryland is a case-in-point. The facility, managed by Maryland Environmental Services, applied compost approximately three inches thick to fourteen acres of berms, drainage ditches and roadsides. Not long after the compost was spread on the site, four inches of rain fell in 48 hours. Whereas top soil would likely have been washed away, there was very little washout on even the steep slopes as a result of using compost. Furthermore, as a top soil substitute, compost can result in substantial cost savings.

The composted product can be processed though a dehydrator to take the moisture content down to the point where the pellets fall apart into granular balls about the size of BB's. The granular product is then cooled and may be bagged for use as a plant food to replace chemical fertilizers.

Sludge treatment plants in localities where plant food, mulch and the like is not in demand, may prefer to burn their waste product. If wood chips or straw have been used as a filler, they have air pollution problems with burning their waste products. The Aspen bark-based pellets have been approved by the Environmental Protection Agency for burning and accordingly may make a more viable waste product for those plants which plan to burn their waste.

Thus there has been shown and described methods of bedding animals and treating sludge which accomplish all of the stated objects.

I claim:

1. A method of providing bedding on the floor of a livestock confinement area, comprising,
   providing Poplar bark-based pellets comprising ground Poplar bark between 5 and 45% by volume, the balance being selected from the group consisting of sawdust, ground wood chips and ground lumber,
   said pellets having a moisture content of between 5 and 15%;
   said pellets having a width of between 1/16 inch and ¾ inch; and
   said pellets having a length of between ⅛ inch and ¾ inch;
   placing said Poplar bark-based pellets on the floor of a livestock confinement area,
   arranging said pellets in a layer of generally uniform depth, and
   housing livestock in said area on said layer of pellets.

2. The method of claim 1 wherein the Poplar wood of said pellets is selected from the group consisting of Aspen, Poplar and Cottonwood.

3. The method of claim 2 wherein said pellets have a moisture content of between 6 and 8%.

4. The method of claim 2 wherein said pellets have a width of between ⅛ inch and ¾ inch.

5. The method of claim 4 wherein said pellets have a length of between ¼ inch and ½ inch.

6. The method of claim 5 wherein said livestock is selected from the group consisting of horses, cattle and hogs.

7. The method of claim 6 wherein said arranging step comprises arranging said pellets in a layer having a depth of between 2 inches and 6 inches.

8. The method of claim 7 wherein said arranging step comprises arranging said pellets in a layer having a depth of between 3 inches and 5 inches.

9. The method of claim 5 wherein said livestock comprises poultry.

10. The method of claim 9 wherein said arranging step comprises arranging said pellets in a layer having a depth of between ¼ inch and 1 inch.

11. The method of claim 5 further comprising periodically removing the pellets in any wet areas of said layer.

12. The method of claim 11 further comprising periodically replacing the Poplar bark-based pellets in said livestock confinement area with fresh pellets.

13. The method of claim 12 further comprising collecting the pellets removed from said livestock confinement area and distributing said removed pellets onto the ground as a filler and fertilizer substitute.

14. The method of claim 5 wherein said Poplar bark-based pellets are formed substantially entirely of Aspen.

15. A method of treating sludge from a human waste treatment facility, comprising
    providing Poplar bark-based pellets comprising
        Poplar bark between 5 and 45% by volume, the balance being selected from the group consisting of ground Poplar wood chips and ground Poplar lumber,
        said pellets having a moisture content of between 5 and 15%;
        said pellets having a width of between 1/16 inch and ¾ inch, and
        said pellets having a length of between ⅛ inch and ¾ inch,
    mixing said Poplar bark-based pellets with sludge in a ratio of one part pellet to up to forty parts sludge by weight, composting the mixed pellets and sludge to form a composted product.

16. The method of claim 15 further comprising drying and granulating said composted product to provide a granular product.

17. The method of claim 16 further comprising distributing said granular product as a plant food and fertilizer substitute.

18. The method of claim 16 further comprising burning said granular product as a fuel.

19. The method of claim 15 wherein the source of said Poplar bark, sawdust, wood chips and lumber is selected from the group consisting of Aspen, Poplar and Cottonwood.

20. The method of claim 19 wherein said pellets have a moisture content of between 6 and 8%.

21. The method of claim 19 wherein said pellets have a width of between ⅛ inch and ¾ inch.

22. The method of claim 19 wherein said pellets have a width of approximately ½ inch.

23. The method of claim 21 wherein said pellets have a length of between ¼ inch and ½ inch.

24. The method of claim 16 wherein said drying and granulating steps comprise mixing said composted product in a heated drying tank, thereby allowing said product to naturally crumble into granular form.

25. The method of claim 15 wherein said bark, sawdust, ground wood chips and ground lumber is comprised substantially entirely of Aspen.

* * * * *